(12) United States Patent
Yashima et al.

(10) Patent No.: US 7,214,634 B2
(45) Date of Patent: May 8, 2007

(54) LAYERED PRODUCT

(75) Inventors: Hiroyuki Yashima, Niigata (JP); Kosuke Watanabe, Niigata (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 87 days.

(21) Appl. No.: 10/473,587

(22) PCT Filed: Apr. 9, 2002

(86) PCT No.: PCT/JP02/03555

§ 371 (c)(1),
(2), (4) Date: Oct. 9, 2003

(87) PCT Pub. No.: WO02/083805

PCT Pub. Date: Oct. 24, 2002

(65) Prior Publication Data

US 2004/0096644 A1    May 20, 2004

(30) Foreign Application Priority Data

Apr. 10, 2001  (JP) ............................. 2001-110893

(51) Int. Cl.
*C09J 111/00* (2006.01)
*B32B 27/00* (2006.01)
(52) U.S. Cl. .................... 442/149; 442/151; 428/304.4
(58) Field of Classification Search ................ 442/149, 442/151; 428/304.4
See application file for complete search history.

(56) References Cited

FOREIGN PATENT DOCUMENTS

| JP | 6-287360 | 10/1994 |
| JP | 7-258308 | 10/1995 |
| JP | 7-292002 | 11/1995 |
| JP | 11-335491 | 12/1999 |
| JP | 2001-030400 | 2/2001 |
| JP | 2002-53703 | 2/2002 |
| WO | WO 00/73385 A1 | 12/2000 |

OTHER PUBLICATIONS

Machine Translation of JP Publ. 06-287360 cited in the Europeans Search Report of Jun. 12, 2006.*
Machine translation of JP Publ. 2001-030400 cited in the European Search Report of Jun. 12, 2006.*

* cited by examiner

*Primary Examiner*—Daniel Zirker
(74) *Attorney, Agent, or Firm*—Oblon, Spivak, McClelland, Maier & Neustadt, P.C.

(57) ABSTRACT

A laminated product is provided which has no problems concerning hygienic safety or environment accompanying the use of solvent-based adhesives and which has been tenaciously bonded in a degree equal or superior to that attainable with conventional CR solvent-based adhesives. The laminated product is obtained by bonding a porous organic material and a cloth with an adhesive comprising, as major ingredients, a polychloroprene latex which is obtained by polymerizing 100 parts by mass of chloroprene with more than 0 part by mass and less than 2 parts by mass of an ethylenically unsaturated carboxylic acid in the presence of from 0.5 to 4 parts by mass of a polyvinyl alcohol and then adding a pH adjustor and a radical scavenger and which has a gel content in the chloroprene polymer of from 10 to 60 mass % and a pH of from 6 to 10, a tackifier resin and a metal oxide.

9 Claims, No Drawings

LAYERED PRODUCT

TECHNICAL FIELD

The present invention relates to a laminated product which is useful as a component required to have cushioning or impact-absorbing properties, of e.g. furniture, bed clothes, interior parts of automobiles, shoe materials such as shoe soles or inner soles of e.g. sports shoes, walking shoes or sandals, health care equipments, clothing, wet suits or packaging materials.

BACKGROUND ART

Heretofore, polychloroprene (hereinafter referred to as CR) solvent-based adhesives have been used to prepare laminated products for e.g. shoe soles or inner soles of e.g. sports shoes or walking shoes.

However, in such CR solvent-based adhesives, an organic solvent such as toluene, ethyl acetate or methyl ethyl ketone is used, and such an organic solvent will evaporate at the work area during the coating operation of the adhesive, such being undesirable from the viewpoint of hygienic safety of workers or environment. Accordingly, it has been desired to reduce the organic solvent.

It is an object of the present invention to provide a laminated product which has no problems concerning hygienic safety or environment accompanying the use of the conventional CR solvent-based adhesives and which has been tenaciously bonded in a degree equal or superior to that attainable by the conventional CR solvent-based adhesives.

DISCLOSURE OF THE INVENTION

As a result of an extensive study to accomplish the above object, the present inventors have invented a sufficiently bonded laminated product by coating an adhesive composition (hereinafter sometimes simply referred to as an adhesive) comprising, as major ingredients, a polychloroprene latex which is obtained by polymerizing 100 parts by mass of chloroprene with more than 0 part by mass and less than 2 parts by mass of an ethylenically unsaturated carboxylic acid in the presence of from 0.5 to 4 parts by mass of a polyvinyl alcohol and then adding a pH adjustor and a radical scavenger and which has a gel content in the chloroprene polymer of from 10 to 60 mass % and a pH of from 6 to 10, a tackifier resin and a metal oxide.

Namely, the present invention provides a laminated product excellent in the bond strength and the water resistant bond strength having a porous organic material and a cloth bonded with an adhesive comprising, as major ingredients, a polychloroprene latex which is obtained by polymerizing 100 parts by mass of chloroprene with more than 0 part by mass and less than 2 parts by mass of an ethylenically unsaturated carboxylic acid in the presence of from 0.5 to 4 parts by mass of a polyvinyl alcohol and then adding a pH adjustor and a radical scavenger and which has a gel content in the chloroprene polymer of from 10 to 60 mass % and a pH of from 6 to 10, a tackifier resin and a metal oxide.

Now, the present invention will be described in detail. In the present invention, the cloth is woven fabric, knitted fabric or non-woven fabric, and the material of fibers, texture, thread count, (T+W) density (T represents warp and W represents weft), thickness and production method are not limited and may be selected in consideration of the texture and color depending upon the particular purpose or application. The woven fabric may, for example, be a spun woven fabric and a filament woven fabric, and the fiber material may, for example, be cotton, silk, rayon, cupola, acetate, triacetate, nylon, polyester, acryl or promix. The knitted fabric may also be called knit goods, knit or jergy cloth, and the fiber material may, for example, be cotton, silk, rayon, cupola, acetate, triacetate, nylon, polyester, acryl or promix. The non-woven fabric may, for example, be a wet system non-woven fabric, a chemical bonded non-woven fabric, a thermal bonded non-woven fabric, an air laid non-woven fabric, a spun lace non-woven fabric, a spun bonded non-woven fabric, a meltblown non-woven fabric, a needle punched non-woven fabric or a stitch bonded non-woven fabric, and the fiber material may, for example, be cotton, rayon, polyester, polypropylene, nylon, acryl, vinylon, glass fiber, pulp or carbon fiber.

In the present invention, the porous organic material is meant for a foamed plastic or a foamed rubber (foam rubber). The foaming method, or the material or thickness of the foamed product, is not particularly limited and may be selected in consideration of the flexibility or the strength of the material depending upon the particular purpose or application.

The foaming method may, for example, be melt foaming, solid phase foaming or cast foaming. A specific example of the melt foaming may be chemical crosslinking foaming, electron beam crosslinking foaming, extrusion foaming, one step press foaming or two step press foaming. A specific example of the solid phase foaming may be a beads method. The cast foaming may, for example, be molding foaming, block foaming (slab foaming), continuous laminate foaming, injection foaming or spray foaming.

Further, the material may, for example, be a flexible foamed urethane (flexible foamed PUR), a foamed polypropylene (foamed PP), a foamed polyethylene (foamed PE), a foamed ethylene/vinyl acetate copolymer (foamed EVA), a foamed vinyl chloride (foamed PVC) or a foamed polychloroprene (foamed CR). Among them, flexible foamed PUR, foamed PP or foamed EVA which is excellent in processability by thermoforming is preferred. Particularly preferred is foamed PP having a density of from 10 to 80 kg/m$^3$ before press bonding, or foamed EVA having a density of from 70 to 120 kg/m$^3$ before press bonding. Within such a density range, the bonding can be made more tenacious. Among them, foamed EVA is particularly preferred since not only tenacious bonding will thereby be possible, but also molding will be easy.

Here, the density is the mass per unit volume of a material at 23° C. and is obtained by determining the volume by measuring the size of a rectangular parallel-piped material by a pair of calipers and by measuring the mass by a weighing apparatus.

The thickness of the porous organic material is not particularly limited and may be selected depending upon the particular purpose or application. For example, in consideration of an application to inner soles for sports shoes, the thickness is preferably at most 10 mm. Further, such a porous organic material may be one having another sheet laminated on such a sheet, so long as the bond surface is made of the above-mentioned porous organic material.

A specific example of the ethylenically unsaturated carboxylic acid in the present invention may be acrylic acid, methacrylic acid, crotonic acid, fumaric acid, maleic acid, citraconic acid or grutaconic acid. These may be used alone or in combination as a mixture of two or more of them. In the present invention, it is preferred to use acrylic acid or methacrylic acid, and it is particularly preferred to use methacrylic acid.

Further, the amount of the ethylenically unsaturated carboxylic acid to be added in the present invention is more than 0 part by mass and less than 2 parts by mass, preferably from 0.7 to 1.5 parts by mass, per 100 parts by mass of chloroprene. If the amount of the ethylenically unsaturated carboxylic acid is 0 part by mass, the stability of the latex will be poor, whereby the production tends to be difficult, or the bond strength in a normal state will be poor. If the amount of the ethylenically unsaturated carboxylic acid is 2 or more parts by mass, the decrease of the water resistant bond strength will be substantial.

Further, the chloroprene polymer to be used in the present invention may have a small amount of copolymerizable another monomer copolymerized in addition to chloroprene and the ethylenically unsaturated carboxylic acid, and such a polymer is also included in the present invention.

In the present invention, the monomer copolymerizable with chloroprene may, for example, be 2,3-dichloro-1,3-butadiene, 1-chloro-1,3-butadiene, butadiene, isoprene, styrene, acrylonitrile, an ester of acrylic acid or an ester of methacrylic acid, and two or more types may be used in combination, as the case requires.

In the present invention, the polyvinyl alcohol is not particularly limited, but one having a saponification degree within a range of from 60 to 98 mol %, is preferred. More preferably, the saponification degree is from 75 to 95 mol %, and further preferably, the saponification degree is from 75 to 90 mol %.

Further, the polyvinyl alcohol is preferably one having a polymerization degree within a range of from 200 to 3000. More preferably, the polymerization degree is from 200 to 700.

When the polyvinyl alcohol is within this range, the polymerization operation can be carried out constantly, and the stability of the obtained latex will be excellent, and it will be possible to obtain a stable latex at a high solid content.

In the present invention, the polyvinyl alcohol is added preferably in an amount of from 0.5 to 4 parts by mass, more preferably from 2 to 4 parts by mass, further preferably from 3 to 3.5 parts by mass, per 100 parts by mass of chloroprene. If the amount of the polyvinyl alcohol added is less than 0.5 part by mass, the emulsifying power tends to be inadequate, whereby agglomerates are likely to be formed during the polymerization reaction. On the other hand, if it exceeds 4 parts by mass, the viscosity tends to increase during the polymerization reaction, whereby stirring tends to be impaired, or abnormal heat generation may result, whereby the production may sometimes become difficult.

Further, the polychloroprene latex in the present invention is required to have a toluene-insoluble gel content within a range of from 10 to 60 mass %, preferably within a range of from 15 to 60 mass %. If the gel content is less than 10 mass %, the bond strength in a normal state tends to be low. On the other hand, if the gel content exceeds 60 mass %, the initial adhesion tends to deteriorate, and the water resistant bond strength tends to be low.

The gel content of the polychloroprene latex can be controlled by controlling ① the type and the amount of a chain transfer agent to be used, ② the polymerization temperature, and ③ the polymerization rate.

Firstly, the chain transfer agent is not particularly limited so long as it is one commonly used for the production of a polychloroprene, and for example, it is possible to use a known chain transfer agent, such as a long chain alkyl mercaptan such as n-dodecylmercaptan, n-octadecylmercaptan or tert-dodecylmercaptan, a dialkylxanthogen disulfide such as diisopropylxanthogen disulfide or diethylxanthogen disulfide, or iodoform.

Next, the polymerization temperature is preferably within a range of from 0 to 55° C. from the viewpoint of the control of the polymerization. In order to carry out the polymerization reaction smoothly and safely, it is particularly preferred to adjust the polymerization temperature within a range of from 30 to 50° C.

Further, the final polymerization rate is preferably at least 80 mass %, more preferably at least 90 mass %.

In the present invention, the solid content concentration of the polychloroprene latex can be adjusted to a necessary concentration by concentration or dilution with water, but it is preferably within a range of from 40 to 65 mass %, more preferably within a range of from 43 to 58 mass %. By adjusting it to have a higher solid content concentration, it will be a latex having a high drying speed and being excellent in the initial adhesion. Further, the solid content concentration can be adjusted also by the ratio of monomers at the time of polymerization, but it can also be adjusted by carrying out concentration after the polymerization.

The chloroprene polymer in the present invention is acidic and in an unstable state immediately after the polymerization, and accordingly, it is necessary to adjust the pH to from 6 to 10. Preferably, the pH is from 6.5 to 9.0. If the pH is less than 6, coagulation, or separation and property change is likely to take place for a long period of storage. On the other hand, an alkaline solution having a pH exceeding 10 is not desirable from the viewpoint of safety in handling.

As the PH adjustor in the present invention, it is preferred to contain a weakly acidic salt such as sodium carbonate, potassium carbonate, trisodium phosphate, disodium hydrogenphosphate, tripotassium phosphate, dipotassium hydrogenphosphate, tripotassium citrate, dipotassium hydrogencitrate, trisodium citrate, disodium hydrogencitrate, sodium acetate, potassium acetate or sodium tetraborate in an amount of at least 0.1 part by mass, more preferably at least 0.3 part by mass, per 100 parts by mass of the solid content of the polychloroprene latex. The weakly acidic salt is required to increase the buffering ability of the polychloroprene latex, and if it is less than 0.1 part by mass, the pH decrease during the storage cannot be suppressed, whereby the storage stability of the adhesive composition deteriorates. In a case where the pH of the polychloroprene latex will not reach 6 by the weakly acidic salt only, a basic substance such as sodium hydroxide, potassium hydroxide or diethanolamine, may optionally be used in combination.

In the present invention, the method for adding the PH adjustor is not particularly limited, and a powder of the PH adjustor may be added directly or after diluting it to an optional proportion with water.

The radical scavenger in the present invention may be a polymerization inhibitor such as thiodiphenylamine, diethyihydroxylamine, hydroquinone, p-t-butylcatechol, 1,3,5-trihydroxybenzene or hydroquinone methyl ether or an antioxidant such as 2,6-di-t-butyl-4-methylphenol, 2,2-methylenebis(6-t-4-methylphenol), 4,4-butylenebis(6-t-butyl-3-methylphenol), ethylenebis(oxyethylene)bis[3-(5-t-butyl-4-hydroxy-m-tolyl)propionate], octadecyl-3-(3,5-di-t-butyl-4-hydroxyphenyl)propionate or pentaerythritoltetrakis[3-(3,5-di-t-butyl-4-hydroxyphenyl)propionate].

As the radical scavenger in the present invention, it is preferred to use from 0 to 0.5 part by mass of the above-mentioned polymerization inhibitor or from 0.1 to 1.5 parts by mass of the above-mentioned antioxidant, per 100 parts by mass of chloroprene. If the antioxidant is less than 0.1 part by mass, the increase of the gel content during the storage of the polychloroprene latex composition cannot be suppressed, whereby the initial bond strength and the water resistant bond strength will deteriorate.

In the present invention, the method for adding the radical scavenger is not particularly limited. However, a method of adding the radical scavenger as dissolved in the chloroprene monomer to the chloroprene polymer, followed by removing the monomer by deaeration, or a method of adding the radical scavenger as emulsified by an addition of e.g. a surfactant, to the chloroprene polymer, is preferred in consideration of the dispersed state of the radical scavenger in the polychloroprene latex composition.

The catalyst to be used for the polymerization of polychloroprene of the present invention, may, for example, be an inorganic peroxide such as potassium persulfate, or an organic peroxide such as a ketone peroxide, a peroxyketal, a hydroperoxide, a dialkyl peroxide or a diacyl peroxide. It is preferred to use potassium persulfate as the catalyst to carry out the polymerization in a stabilized condition. Further, it is preferred to use potassium peroxide in the form of an aqueous solution having a concentration of from 0.1 to 5 mass %.

In order to increase the activities of the catalyst to be used for the polymerization of the polychloroprene latex of the present invention, sodium sulphite, potassium sulphite, ferrous sulfate, sodium anthraquinone β-sulfonate, formamidine sulfonic acid or L-ascorbic acid may, for example, be added.

The tackifier resin in the present invention may, for example, be a rosinate resin, a terpene phenol resin, a coumarone-indene resin, an aliphatic hydrocarbon resin or an aromatic resin. As the tackifier resin, an emulsion of a terpene phenol resin or rosinate resin is preferred to obtain the initial bond strength or the water resistant bond strength of the adhesive composition.

The amount of the tackifier resin is preferably from 20 to 150 parts by mass, particularly preferably from 30 to 100 parts by mass, per 100 parts by mass of the polychloroprene latex. If it is less than 20 parts by mass, the initial bond strength and the water resistant bond strength tend to be low, and if it exceeds 150 parts by mass, formation of the adhesive coating film tends to be impaired, whereby the bond strength tends to be low.

The metal oxide in the present invention may, for example, be zinc oxide, titanium oxide or iron oxide. Zinc oxide or titanium oxide is preferred in order to improve the water resistance of the adhesive composition, and it is particularly preferred to use zinc oxide.

The amount of the metal oxide is preferably from 0.2 to 8.0 parts by mass, particularly preferably from 0.5 to 6.0 parts by mass, per 100 parts by mass of the polychloroprene latex. If it is less than 0.2 part by mass, the water resistant bond strength of the adhesive composition may sometimes be inadequate, and if it exceeds 8.0 parts by mass, the bond strength in a normal state tends to deteriorate.

To the adhesive composition of the present invention, a curing accelerator such as isocyanate or ethylene thiourea, an inorganic filler such as calcium carbonate, silica, talc or clay, a plasticizer or softener such as dibutyl phthalate or process oil, a thickener such as sodium polyacrylate, water-soluble polyurethane or methyl cellulose, a surfactant such as a polyoxyalkylene alkyl ether, a 1:2 mol type aliphatic alkanolamide, a 1:1 mol type diethanolamide or a polyoxyethylene stearate, a film-formation assistant agent such as propylene glycol n-butyl ether, dipropylene glycol n-butyl ether or tripropylene glycol n-butyl ether, an antifungal agent, a dyestuff, various antioxidants, an ultraviolet absorber, an antioxidant, etc. may optionally be incorporated, as the case requires.

The adhesive of the present invention is prepared by mixing the polychloroprene latex, the tackifier resin, the metal oxide, etc. The mixing apparatus is not particularly limited, and a known apparatus such as a three one motor, a homogenizer, a media mill or a colloid mill may be used.

Coating of the adhesive of the present invention is not particularly limited, but is preferably carried out only on the porous organic material side. As a method for coating the adhesive to the porous organic material, automated mechanical coating capable of uniform coating, is preferred, but the coating method is not particularly limited. Usually, a method such as brush coating, troweling, spray coating, roll coater coating or bar coater coating may be used.

The laminated product of the present invention can be obtained by coating the adhesive on the porous organic material, laminating a cloth thereon, followed by press bonding by a press machine. Such a bonding and laminating method is not particularly limited. In a case where the viscosity of the adhesive is low, it is preferred to introduce a preliminary drying step prior to laminating a cloth after coating the adhesive on the porous organic material.

By the preliminary drying machine, it is possible to prevent oozing out of the adhesive from the cloth during pressing. The preliminary drying temperature is preferably from 50 to 80° C., more preferably from 60 to 80° C. If it is higher than 80° C., the porous organic material is likely to undergo thermal deformation before the pressing step. Further, the coating of the adhesive and lamination, may be followed by drying at from 100 to 140° C. and then by press bonding by a press machine.

The pressing method may be hot pressing or cold pressing. In the hot pressing, a temperature of from 100 to 130° C. is preferred. In the case of cold pressing, a step of heating the porous organic material having the cloth mounted thereon at a temperature of from 100 to 130° C. is required prior to the pressing. The pressure in the pressing step is not particularly limited and may be set depending upon the particular purpose and application. In order to secure an adequate bond strength without damaging the porous organic material of the laminate, it is preferably from 0.05 to 10 MPa, more preferably from 0.1 to 6 MPa. In the pressing step, shaping depending upon the particular purpose or application can be carried out by a method of pressing the softened sheet by heat, such as a free drawing method, a matched mold forming method, a plug and ring forming method, a slip forming method (draw forming method), a vacuum forming method or a compression molding method.

EXAMPLES

Now, the present invention will be described with reference to Examples, but the present invention is by no means restricted by these Examples. Further, in the following Examples, "parts" and "%" are based on mass unless otherwise specified.

Example 1

Production of a Polychloroprene Latex

Using a reactor having an internal capacity of 30 liters, 94 parts by mass of water and 3.5 parts by mass of polyvinyl alcohol (DENKA POVAL B-05, saponification degree: 88 mol %, polymerization degree: 550) were put, heated (60° C.) and dissolved in a nitrogen stream. This aqueous solution was cooled to near room temperature, and then, 99 parts by mass of a chloroprene monomer, 1.0 part by mass of methacrylic acid and 0.3 part by mass of octylmercaptan were added thereto.

While maintaining this at 45° C., polymerization was carried out by using sodium sulphite and potassium persulfate as initiators to obtain a polychloroprene latex. The final polymerization rate was 99.5%.

Then, to this polychloroprene latex, a 10% sodium carbonate aqueous solution was added to adjust the PH, and then, 3 parts of a 20% aqueous solution of an aliphatic alkanolamide (manufactured by DIAMOND SHAMROCK CHEMICAL COMPANY) and 0.5 part by mass of a radical scavenger (Cellosol H633, manufactured by Chukyo Yushi Co., Ltd.; one obtained by emulsifying 2,6-di-t-butyl-4-methylphenol) were added to obtain latex A having the solid content adjusted to 47%.

Then, with respect to this polychloroprene latex, the following measurements were carried out.

Measurement of the Gel Content

The polychloroprene latex sample was freeze-dried and accurately weighed to obtain A. It was dissolved in toluene (adjusted to 0.6%), and using a centrifugal separator and further using a metal net of 200 mesh, the gel was separated. The gel content was air-dried and then dried in an atmosphere of 110° C. for one hour and accurately weighed to obtain B.

The gel content was calculated in accordance with the following formula.

Gel content=B/A×100(%)

The result was 38%.

Measurement of the pH

The latex sample was adjusted to 20° C. in a constant temperature water tank, whereupon the pH was measured by a pH meter. The pH was 7.5.

Production of an Adhesive 100 parts by mass of polychloroprene latex A, 70 parts by mass of a terpene phenol resin (Tamanol E-100, manufactured by Arakawa Chemical Industries, Ltd.) and 1 part by mass of zinc oxide (AZ-SW, manufactured by OSAKI INDUSTRY CO., LTD.) were stirred by a three one motor to prepare adhesive A.

Further, adhesive A was coated on a foamed EVA sheet (2A-1064, manufactured by MITSUFUKU INDUSTRY CO., LTD., thickness: 5 mm) by a brush. The amount of adhesive A coated was 80 g (wet)/m². The coated foamed EVA sheet was dried at 70° C. for one minute to form an adhesive layer, and a polyester cloth was overlaid thereon, followed by press bonding under a pressure of 1 MPa by a press machine heated to 120° C. to obtain laminated product A. The process from this coating to the bonding will be referred to as bonding method A.

The laminated product was evaluated by the following methods.

Initial Bond Strength

Upon expiration of 10 minutes from the press bonding, the 180° C. peel strength was measured by a tensile tester at a speed of 200 mm/min.

Bond Strength in a Normal State

Upon expiration of five days from the press bonding, the 180° C. peel strength was measured by a tensile tester at a speed of 200 mm/min.

Water Resistant Bond Strength

Upon expiration of one day from the press bonding, the sample was immersed in pure water at 23° C. for 2 days, whereupon the 180° C. peel strength was measured by a tensile tester at a speed of 200 mm/min.

Example 2

In Example 1, 100 parts by mass of latex A, 70 parts by mass of a rosinate resin (SK-90D, manufactured by Harima Chemicals, Inc.), 1 part by mass of zinc oxide (AZ-SW, manufactured by OSAKI INDUSTRY CO., LTD.) and 2 parts by mass of ethylenethiourea (Axel-22S, manufactured by Kawaguchi Kogyo K.K.) were stirred by a three one motor to prepare adhesive B. Adhesive B was coated on a foamed EVA sheet (2A-1064, manufactured by MITSUFUKU INDUSTRY CO., LTD., thickness: 5 mm) by a brush, followed by bonding by bonding method A to obtain laminated product B.

Example 3

Adhesive A was coated on a foamed EVA sheet (2A-1064, manufactured by MITSUFUKU INDUSTRY CO., LTD., thickness: 5 mm) by a brush. The amount of adhesive A coated was 80 g (wet)/m². The coated foamed EVA sheet was dried at 70° C. for one minute to form an adhesive layer, and a polyester cloth was overlaid thereon, followed by press bonding under a pressure of 1 MPa by a press machine at room temperature, to obtain laminated product C. The process from coating of the adhesive to the bonding will be referred to as bonding method B.

Comparative Example 1

In the same manner as in Example 1 except that the chloroprene monomer was 95 parts by mass and methacrylic acid was 5.0 parts by mass, latex B having a solid content of 47% was obtained.

The pH of latex B was 8.0, and the gel content was 45%.

100 parts by mass of polychloroprene latex B, 70 parts by mass of a terpene phenol resin (Tamanol E-100, manufactured by Arakawa Chemical Industries, Ltd.) and 1 part by mass of zinc oxide (AZ-SW, manufactured by OSAKI INDUSTRY CO., LTD.) were stirred by a three one motor to obtain adhesive C.

Adhesive C was coated on a foamed EVA sheet (2A-1064, manufactured by MITSUFUKU INDUSTRY CO., LTD., thickness: 5 mm) by a brush, and by bonding method A, laminated product D was obtained.

With respect to the laminated products obtained in Examples 1 to 3 and Comparative Example 1, the initial bond strength, the bond strength in a normal state and the water resistant bond strength were evaluated by the above-described methods, and the results are shown in Table 1.

In Examples 1 to 3, the bond strength was so high that the material underwent cohesive failure at the time of the measurement, and no numerical value was obtained.

TABLE 1

| | Example 1 | Example 2 | Example 3 | Comparative Example 1 |
|---|---|---|---|---|
| Laminated product | Laminated product A | Laminated product B | Laminated product C | Laminated product D |
| Adhesive | Adhesive | Adhesive | Adhesive | Adhesive |

TABLE 1-continued

|  | Example 1 | Example 2 | Example 3 | Comparative Example 1 |
|---|---|---|---|---|
| Type | A | B | A | C |
| Bonding method | Bonding method A | Bonding method A | Bonding method B | Bonding method A |
| Bond strength (N/mm) |  |  |  |  |
| Initial bond strength | Cohesive failure | Cohesive failure | Cohesive failure | Cohesive failure |
| Bond strength in a normal state | Cohesive failure | Cohesive failure | Cohesive failure | Cohesive failure |
| Water resistant bond strength | Cohesive failure | Cohesive failure | Cohesive failure | 0.5 |

INDUSTRIAL APPLICABILITY

As is evident from Table 1, the laminated product of the present invention is excellent in the initial bond strength, the bond strength in a normal state and the water resistant bond strength and is thus useful as a component required to have impact absorption, of furniture, bed clothes, interior parts of automobiles, shoe materials, etc.

The invention claimed is:

1. A laminated product comprising a porous organic material and a cloth bonded with an adhesive, wherein the adhesive comprises as major ingredients:
    a polychloroprene latex which is obtained by polymerizing 100 parts by mass of chloroprene with more than 0 part by mass and less than 2 parts by mass of an ethylenically unsaturated carboxylic acid in the presence of from 0.5 to 4 parts by mass of a polyvinyl alcohol and then adding a pH adjustor and a radical scavenger and which has a gel content in the chloroprene polymer of from 10 to 60 mass % and a pH of from 6 to 10,
    a tackifier resin, and
    a metal oxide,
    wherein the radical scavenger is a polymerization inhibitor or an antioxidant, and from more than 0, to 0.5 parts by mass of the polymerization inhibitor or from 0.1 to 1.5 parts by mass of the antioxidant, is used per 100 parts by mass of the chloroprene, and wherein the pH adjustor comprises a weakly acidic salt.

2. The laminated product according to claim 1, wherein the polyvinyl alcohol has a saponification degree of from 75 to 90 mol %.

3. The laminated product according to claim 1, wherein the metal oxide is zinc oxide or titanium oxide.

4. The laminated product according to claim 1, wherein the porous organic material is a foamed ethylene/vinyl acetate copolymer.

5. The laminated product according to claim 1, wherein the ethylenically unsaturated carboxylic acid is acrylic acid or methacrylic acid.

6. The laminated product according to claim 1, wherein the polychloroprene latex has a solid content concentration of from 40 to 65 mass %.

7. The laminated product according to claim 1, wherein the tackifier resin is a terpene phenol resin or a rosinate resin and is added in an amount of from 20 to 150 parts by mass per 100 parts by mass of the polychloroprene latex.

8. A bonding method which comprises bonding a porous organic material and a cloth with an adhesive, wherein the adhesive comprises as major ingredients:
    a polychloroprene latex which is obtained by polymerizing 100 parts by mass of chloroprene with more than 0 part by mass and less than 2 parts by mass of an ethylenically unsaturated carboxylic acid in the presence of from 0.5 to 4 parts by mass of a polyvinyl alcohol and then adding a pH adjustor and a radical scavenger and which has a gel content in the chloroprene polymer of from 10 to 60 mass % and a pH of from 6 to 10,
    a tackifier resin, and
    a metal oxide,
    wherein the radical scavenger is a polymerization inhibitor or an antioxidant, and from more than 0, to 0.5 parts by mass of the polymerization inhibitor or from 0.1 to 1.5 parts by mass of the antioxidant, is used per 100 parts by mass of the chloroprene, and wherein the pH adjustor comprises a weakly acidic salt.

9. The bonding method according to claim 8, wherein the bonding is carried out by coating the adhesive only on the porous organic material side.

* * * * *